(12) United States Patent
Daoud et al.

(10) Patent No.: US 6,603,918 B2
(45) Date of Patent: Aug. 5, 2003

(54) FIBER-OPTIC CABLE ROUTING AND BEND LIMITING DEVICE

(75) Inventors: Bassel Hage Daoud, Parsippany, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 72 days.

(21) Appl. No.: 09/891,628

(22) Filed: Jun. 25, 2001

(65) Prior Publication Data

US 2002/0197044 A1 Dec. 26, 2002

(51) Int. Cl.[7] .................................................. G02B 6/00
(52) U.S. Cl. ......................... 385/134; 385/134; 385/136
(58) Field of Search ................................. 385/134, 136, 385/12, 13, 100, 87, 137

(56) References Cited

U.S. PATENT DOCUMENTS

| | | | | |
|---|---|---|---|---|
| 5,715,348 A | * | 2/1998 | Falkenberg et al. | 385/135 |
| 6,148,133 A | * | 11/2000 | Daoud | 385/135 |
| 6,271,476 B1 | * | 8/2001 | Bobowick et al. | 174/135 |
| 6,321,017 B1 | * | 11/2001 | Janus et al. | 385/134 |
| 6,445,865 B1 | * | 9/2002 | Janus et al. | 385/135 |
| 6,487,357 B1 | * | 11/2002 | Daoud et al. | 385/135 |

* cited by examiner

*Primary Examiner*—James Phan
*Assistant Examiner*—Joshua Pritchett

(57) ABSTRACT

A fiber-optic cable routing and bend limiting device having a base with a top surface that defines a plane. A bend limiter and a mounting plate extend generally perpendicular to and away from the plane at opposite ends of the base. A separation bar also extends generally perpendicular to and away from the plane and is positioned between the bend limiter and mounting plate. The bend limiter has a generally arcuately-shaped surface and a generally planar surface that enables adjacent placement of two fiber-optic cable routing and bend limiting devices constructed in accordance with an embodiment of the present invention. When two devices in accordance with the present invention are positioned adjacent each other with their respective planar surfaces confrontingly opposite each other, their respective arcuate surfaces define a generally continuous cable routing path between the two adjacently positioned devices.

13 Claims, 5 Drawing Sheets

FIBER-OPTIC CABLE ROUTING AND BEND LIMITING DEVICE

BACKGROUND OF THE INVENTION

1. Field of the Invention

The present invention is directed to a fiber-optic cable routing and bend limiting device.

2. Background of the Invention

For most data and voice communications, fiber-optic cable is the preferred transmission medium. Its small size, immunity to electromagnetic interference, and bandwidth, are just a few of the reasons why fiber is preferred. At the same time, a fiber-optic cable is physically less robust than a copper-based cable. Consequently, greater care is required when routing fiber-optic cables between and among the various equipment in a communications equipment room (referring to either of both voice and data), or elsewhere. A primary concern is maintaining a minimum bend radius for fiber-optic cables as those cables are routed. Too much bending may damage the cable and may also adversely affect the optical characteristics of the cable. Consequently, an optical signal propagating through a fiber-optic cable that is bent beyond a preferred limit may degrade, resulting in degradation to the voice or data which the optical signal represents.

It is also desirable to provide fiber-optic cable routing between adjacent pieces of equipment. In a communications room, fiber-optic cables may be routed into the room and to a specific piece of equipment. Alternatively, fiber-optic cables may be routed between and among various pieces of equipment in the room. It is not uncommon for fiber-optic cables to be routed between adjacently positioned pieces of communication equipment.

It is often necessary to splice already-installed fiber-optic cables to provide for connection to a different end-point. Such splices typically require removal of a section of the fiber-optic cable, which changes the length (i.e., shortens) of the cable. Since fiber-optic cables are typically installed with a certain amount of slack in the cable, splicing changes the amount of slack that must be accommodated. Following a splice it thus becomes necessary to accommodate a different length of fiber cable.

It is thus desirable to provide a fiber-optic cable routing and bend limiting device that ensures a minimum bend radius is maintained, and that permits routing of fiber-optic cables between and among various communications equipment, including adjacently positioned equipment.

SUMMARY OF THE INVENTION

The present invention is directed to a fiber-optic cable routing and bend limiting device that ensures a minimum bend radius for fiber-optic cables and that may be used to route and store between adjacently positioned equipment enclosures or other structures.

The present invention is directed to a fiber-optic cable routing and bend limiting device having a base with a top surface that defines a plane. A bend limiter and a mounting plate extend generally perpendicular to and away from the plane at opposite ends of the base. A separation bar also extends perpendicular to and away from the plane and is positioned between the bend limiter and mounting plate. The separation bar contains two arcuate shaped surfaces which prevent damage to the fiber optic cables. First and second cable routing paths are defined by the bend limiter, separation bar, and mounting plate. Each of the bend limiter, mounting plate, and separation bar have a plurality of retainers for securing a fiber-optic cable on the routing and bend limiting device and along one of the cable routing paths.

The mounting plate facilitates mounting the device to a variety of surfaces and may include a mounting feature such as, for example, mounting rails, that facilitate slidingly removable mounting of the device to an equipment enclosure or other structure. A locking tab may be provided on the device for removably locking the device in place on the equipment enclosure or other structure.

The bend limiter has a generally arcuately-shaped surface and a generally planar surface that enables adjacent placement of two fiber-optic cable routing and bend limiting devices constructed in accordance with an embodiment of the present invention. The arcuately-shaped surface provides bend limiting of a fiber-optic cable routed on and by the inventive device limits the bend radius of the fiber optic cable to less than a predetermined amount. When two devices in accordance with the present invention are positioned adjacent each other with their respective planar surfaces confrontingly opposite each other, their respective arcuate surfaces define a generally continuous cable routing path between the two adjacently positioned devices.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
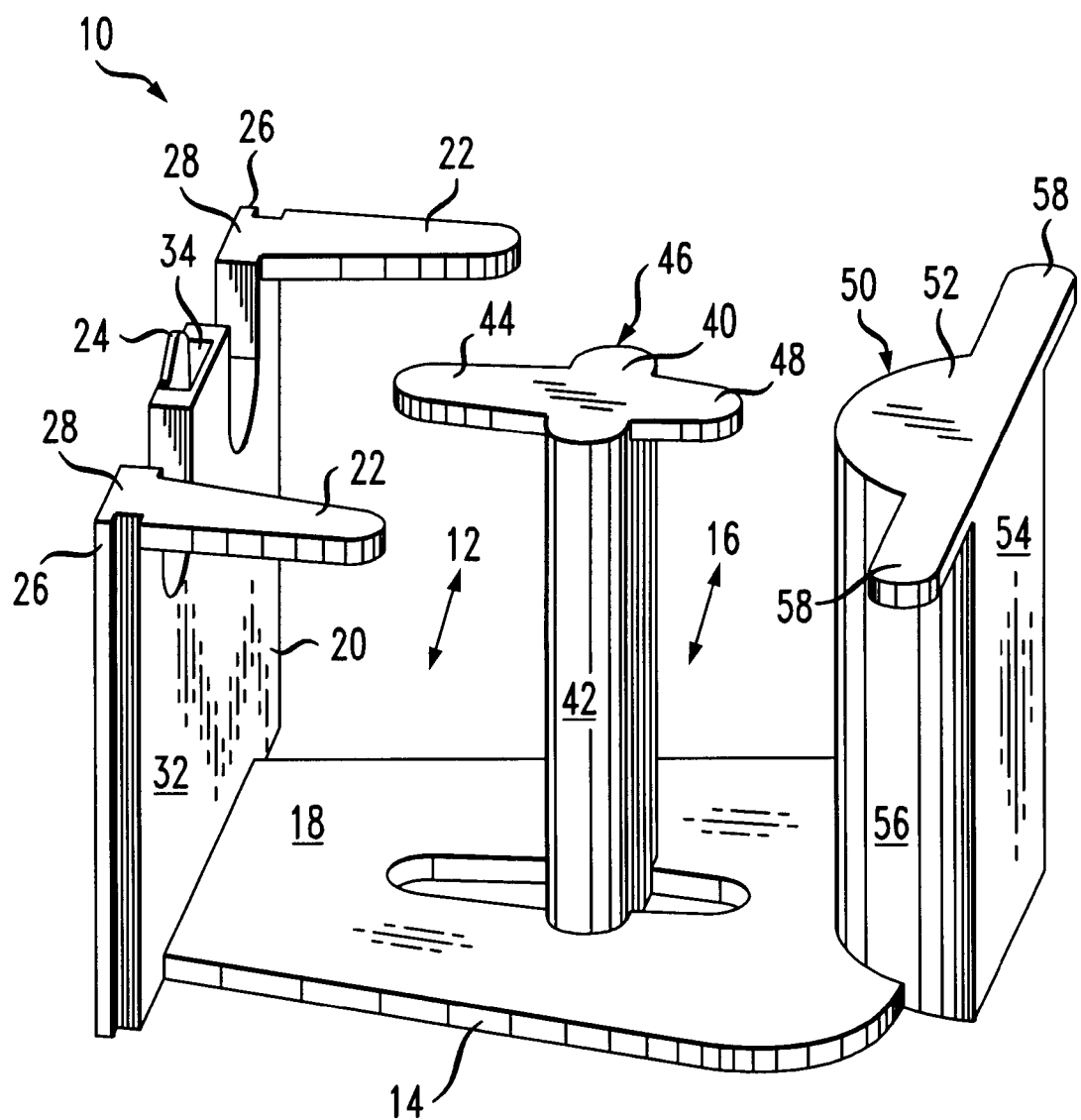
FIG. 1 is a perspective view of a fiber-optic cable routing and bend limiting device constructed in accordance with an embodiment of the present invention.
Figure 2:
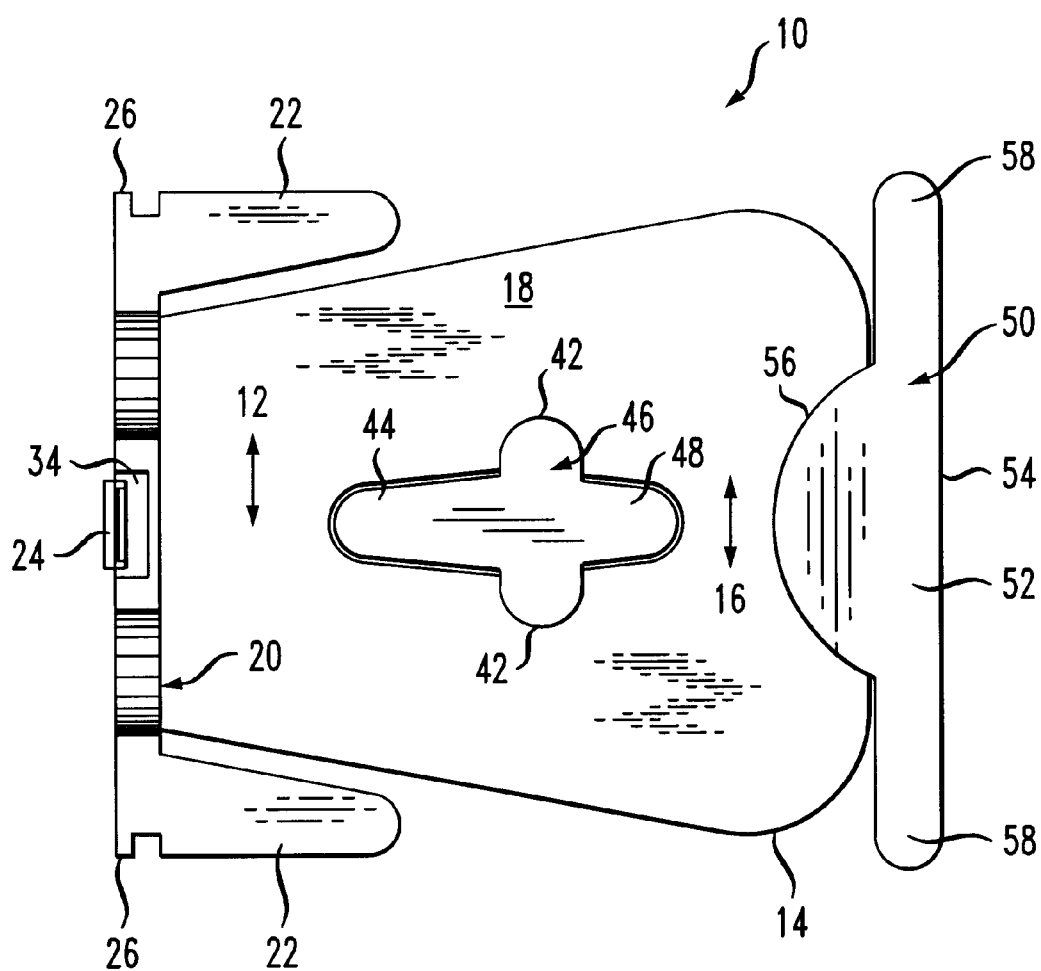
FIG. 2 is a top view of the routing and bend limiting device of FIG. 1.

Referring now to the drawings in detail, the various embodiments of the present invention will now be discussed. With reference first to FIGS. 1–2, a fiber-optic cable routing and bend limiting device constructed in accordance with an embodiment of the present invention is there depicted and generally designated by reference numeral 10. The inventive routing and bend limiting device 10 is preferably unitarily formed and includes a base 14 having a top surface 18 that defines a plane. A mounting plate 20 extends generally perpendicular to and away from the plane at an end of the base 14, and a bend limiter 50 extends generally perpendicular to and away from the plane at an opposite end of the base 14. A separation bar 46 also extends generally perpendicular to and away from the plane between the mounting plate 20 and bend limiter 50. The separation bar 46 has two generally arcuate surfaces 42 that provide a smooth surface over which a fiber-optic cable may be routed. Two cable routing paths 12, 16 are defined by the base 14, mounting plate 20, bend limiter 50, and separation bar 46.

Figure 5:
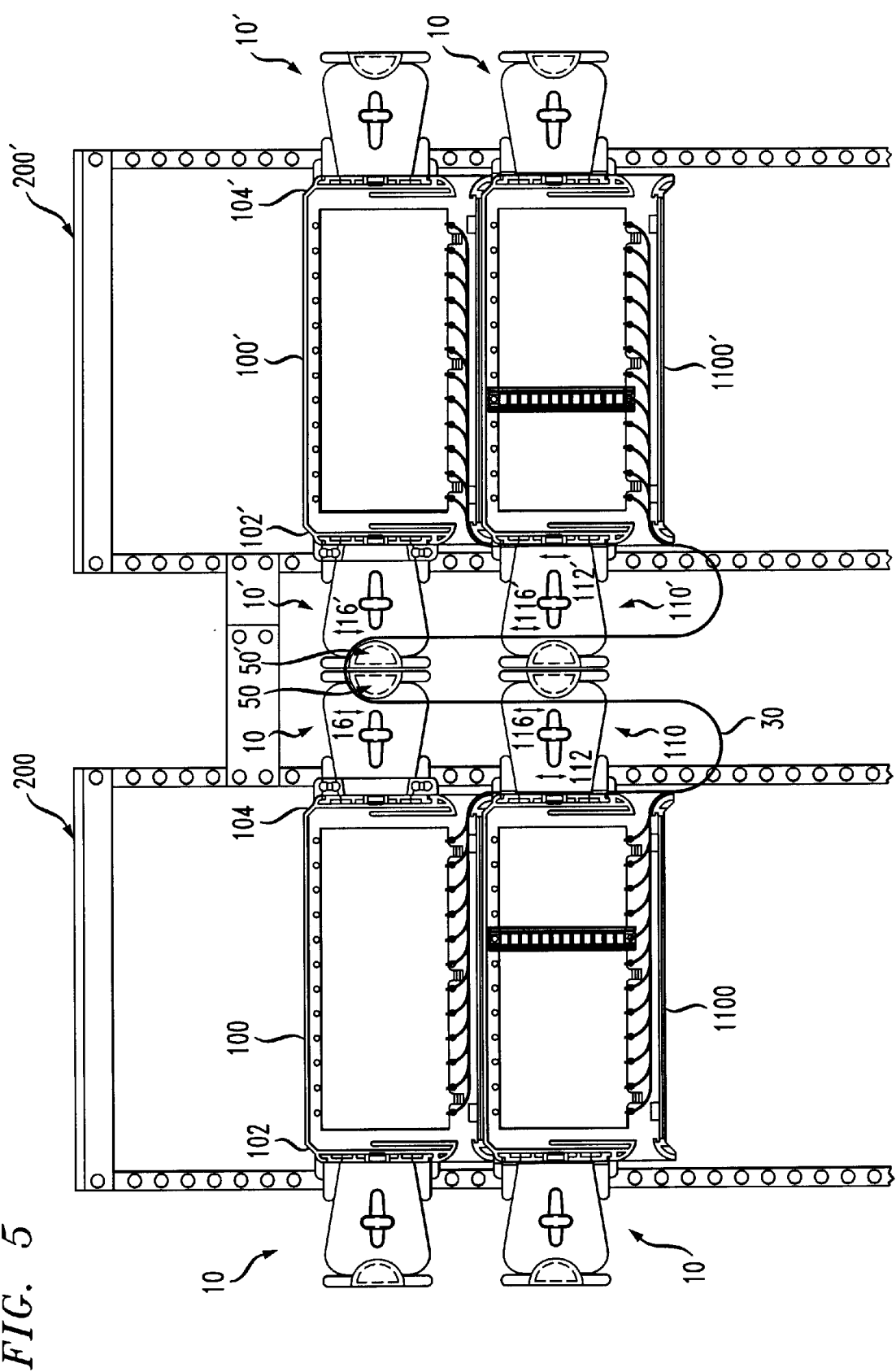
FIG. 5 is a front view of two equipment frames having a plurality of enclosures mounted therein, each enclosure having two fiber-optic cable routing and bend limiting devices constructed in accordance with an embodiment of the present.

The bend limiter 50 has a surface 56 that defines a generally arcuate path over which a fiber-optic cable may be routed and that defines a part of routing path 16. The bend limiter 50 also has a generally planar surface 54 that facilitates adjacent positioning of two cable routing and bend limiting devices 10, as depicted in FIG. 5, as discussed in more detail herein. Fiber-optic cables may be routed through and may be secured by the inventive routing and bend limiting device 10. Two cable routing paths 12, 16 are defined by the various parts of the device 10, as discussed in more detail herein, and a fiber-optic cable may be routed over the two routing paths 12, 16 in any direction, and over the various parts of the device 10 in any manner, as may be useful or necessary to route fiber-optic cables when the device 10 is installed and in use. The directional arrows used to designate the routing paths 12, 16, and any description herein to a particular routing path for a fiber-optic cable, is provided by way of illustration only, and is not intended to limit the scope or spirit of the present invention. Moreover, the arrangement of the various parts of the device 10, and the features of those various parts (e.g., arcuate surfaces, retainers, etc.) facilitate routing of a fiber-optic cable along virtually any path through and over the device 10. Thus, while it may be preferred to route a fiber-optic cable over the paths generally designated as 12 and 16, other paths may also be defined by the device 10.

A plurality of retainers prevent a fiber-optic cable from slipping off the device 10. Two retainers 22 are provided on a top 28 of the mounting plate 20, two retainers 44, 48 are provided on a top 40 of the separation bar 46, and two retainers 58 are provided on a top 52 of the bend limiter 50. Retainers 22 and retainer 44 are complementary and secure a fiber-optic cable in place routing path 12, which may also be referred to as a cable storage path because it may facilitate routing and storage of a plurality of fiber-optic cables for a single enclosure 100 or equipment frame 200 (see, e.g., FIG. 5). Retainer 48 prevents a cable from slipping off of the separation bar 48, while retainers 58 prevent a cable from slipping off of bend limiter 50.

Figure 3:
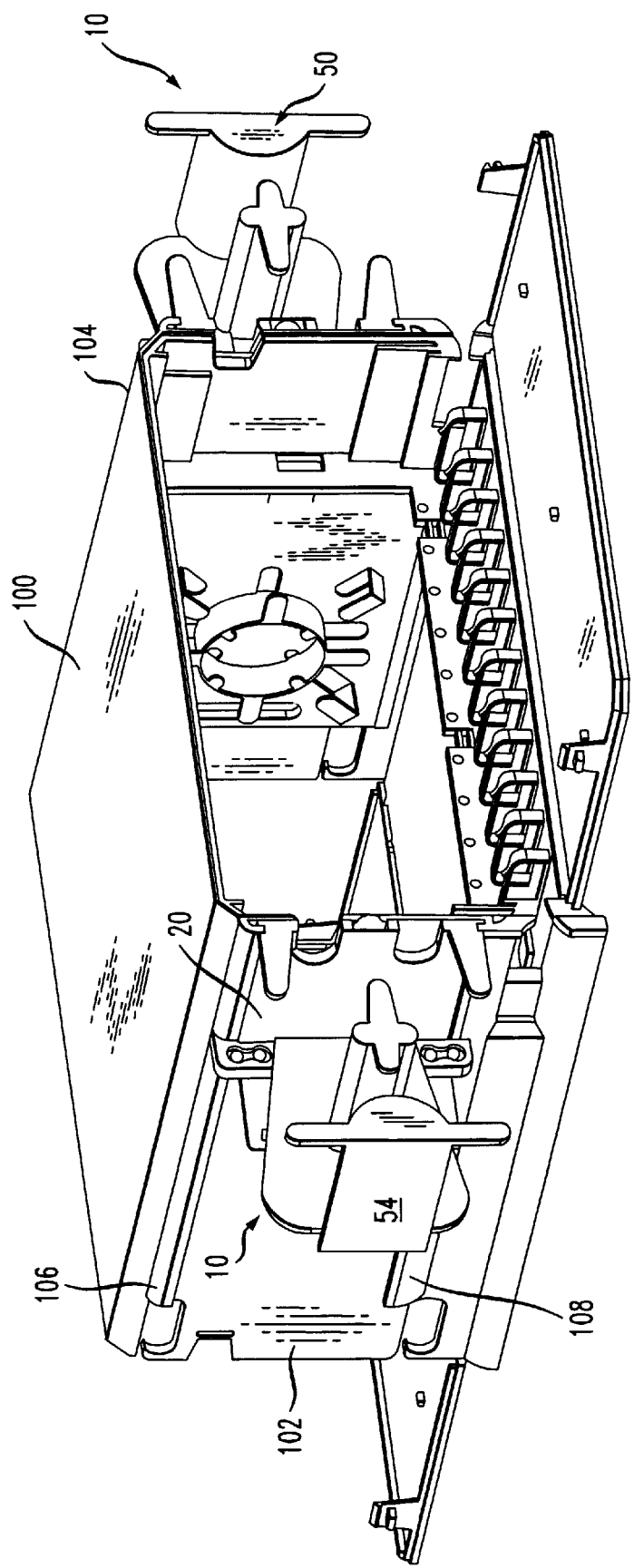
FIG. 3 is a perspective view of an enclosure having a fiber-optic cable routing and bend limiting device constructed in accordance with an embodiment of the present invention provided on opposite sides of the enclosure.
Figure 4:
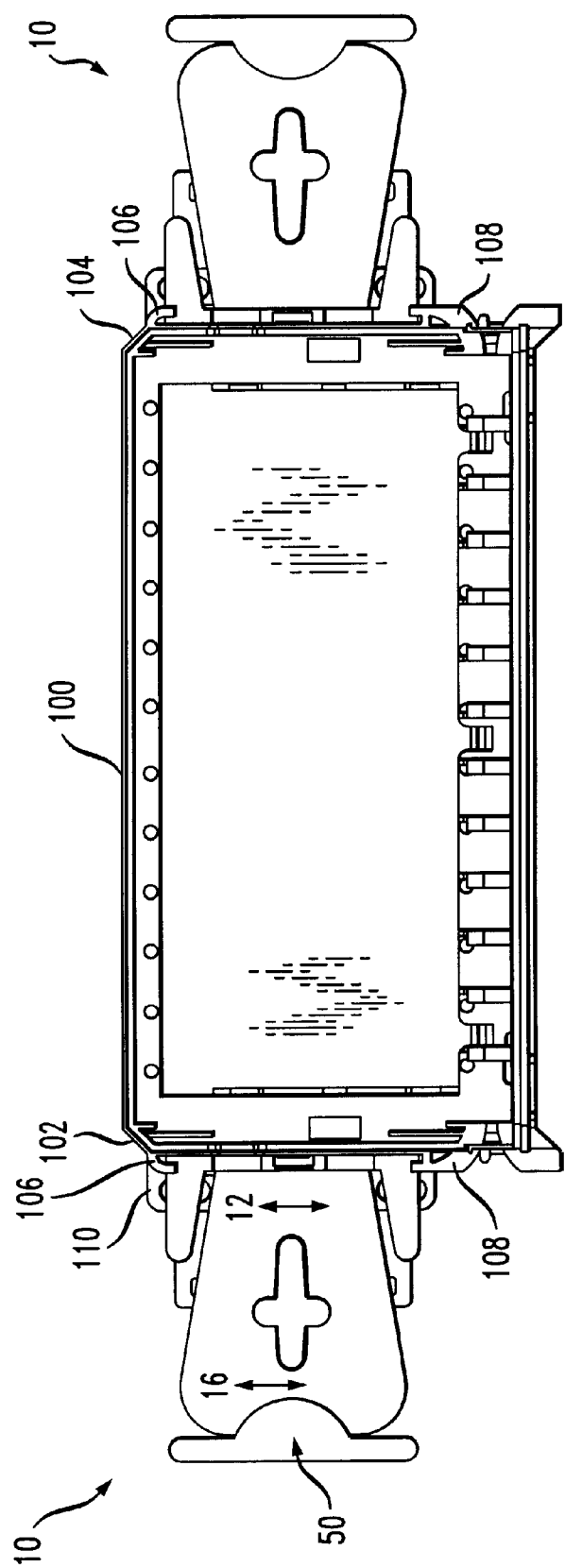
FIG. 4 is a front view of the enclosure of FIG. 3.

Referring next to FIGS. 3–5, and with continued reference to FIG. 1, an application of the inventive cable routing and bend limiting device 10 will now be discussed. The device 10 may be used in connection with an electronic enclosure 100 to facilitate routing of a fiber-optic cable into and out of the enclosure, and to other enclosures within a single equipment frame 200, or to enclosures in other equipment frames 200 (see, e.g., FIG. 5). The device 10 may be releasably secured to the enclosure 100 using a mounting feature on the device 10 that is complementarily sized and shaped to a feature on the enclosure 100. In an embodiment of the present invention, a mounting rail 26 (see, e.g., FIG. 1) is defined on opposite sides of the mounting plate 20, and extends generally from the base 14 to the top 28 of the mounting plate 20. Each mounting rail 26 is sized and shaped to slidingly fit in a mounting track 106, 108, provided on a side 102, 104 of the enclosure 100. A locking tab 24 provided on the mounting plate 20 releasably secures the device 10 in place on the side 102, 104 of the enclosure 100. The locking tab 24 moves freely in a channel 34 defined in the mounting plate 20 and is self-biased in a direction generally perpendicular to and away from a plane defined by a surface 32 of the mounting plate 20. The device 10 may be secured in place on the enclosure 100 by aligning the mounting rails 26 with the mounting tracks 106, 108 and sliding the device 10 along the tracks 106, 108 until the base 14 contacts a stop 110 on the enclosure 100 and the locking tab 24 engages a complementarily sized and shaped receptacle (not shown) defined in the enclosure 100. The device 10 may be released and removed by lifting the locking tab 24 and sliding the device 10 along the tracks 106, 108. A single device 10 may be provided on an enclosure 100, or two devices 10 may be provided on opposite sides of the enclosure 10, as depicted in FIGS. 3–5, as a routine matter of design choice.

With reference now to FIG. 5, a cable routing application of the cable routing and bend limiting device of the present invention will now be discussed. First and second equipment frames 200, 200' are positioned adjacent each other in an equipment room. A plurality of equipment enclosures 100, 100' are mounted in the frames 200, 200' and may contain a plurality of electronic equipment, circuit boards, and the like. A plurality of fiber-optic cables may be routed to each frame 200, 200', and to each of the enclosures 100, 1100, 100', 1100' in each frame 200, 200' (a single fiber-optic cable 30 is depicted for clarity and ease of discussion). The design and construction of the device 10 of the present invention enables two such devices 10 to be installed on adjacently positioned enclosures 100, 100'. The generally planar surface 54 of each adjacently positioned bend limiter 50 (see, e.g. FIG. 1) face each other, with the arcuate surfaces 56, 56' of the two adjacently positioned bend limiters 50, 50' forming a smooth path over which a fiber-optic cable 30 may be routed without the possibility of the cable 30 being bent more than a desired amount. A fiber-optic cable 30 may originate in a first enclosure 100, be routed generally downward over a routing path 12, and then generally upward over a routing path 16 of a first device 100 mounted to that enclosure 100. The cable 30 may then be routed generally downward therefrom over a routing path 112 of a device 110 mounted to the enclosure 1100 positioned beneath enclosure 100, generally upward over a routing path 116 of device 110, and then over a routing path 16 of the device 10 mounted to enclosure 100. The cable 30 may then be routed over a bend limiter 50 of device 10, and immediately thereafter over a bend limiter 50' of a device 10' mounted to enclosure 100' which is mounted in equipment frame 200' and is positioned adjacent to enclosure 100. Arcuate surface 54, 54' (not shown in FIG. 5) define a part of the cable routing path and together provide bend limiting of a fiber-optic cable 30 routed between the adjacently positioned equipment frames 200, 200' and enclosures 100, 100'. The cable 30 may then be routed generally downward from device 10' to device 110' over a routing path 16' and 116', and then generally upward over routing path 112' to either or both of the enclosures 1100', 100'. It will be obvious to persons skilled in the art and from the disclosure provided herein that the above-described fiber-optic cable routing path is an illustrative, non-limiting example of one of many cable routing paths possible with the cable routing and bend limiting device 10 of the present invention.

As can be clearly seen in FIG. 5, the device 10 of the present invention advantageously enables two such devices 10 to be mounted to adjacently positioned enclosures 100, 100', mounted in adjacently positioned equipment frames 200, 200'. Cable routing and management of a plurality of fiber-optic cables, without risk of over-bending, is provided by the device 10 of the present invention.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A fiber-optic cable routing and bend limiting device comprising:
   a base having a top surface defining a plane;
   a bend limiter extending from an end of said base and in a direction generally perpendicular to and away from said plane, said bend limiter having an arcuate surface and a planar surface;
   a mounting plate extending from another end of said base and in a direction generally perpendicular to and away from said plane; and
   a separation bar extending from said base and in a direction generally perpendicular to and away from said plane between said bend limiter and said mounting plate so as to define a first cable routing path between said separation bar and said bend limiter, and a second cable routing path between said separation bar and said mounting plate;
   wherein said arcuate surface of said bend limiter defines a part of said first cable routing path.

2. A fiber-optic cable routing and bend limiting device as recited by claim 1, wherein said bend limiter further comprises a plurality of retainers for holding a fiber-optic cable on said bend limiter and on said first cable routing path.

3. A fiber-optic cable routing and bend limiting device as recited by claim 2, wherein said separation bar further comprises a retainer for holding a fiber-optic cable on said first cable routing path.

4. A fiber-optic cable routing and bend limiting device as recited by claim 1, wherein said mounting plate further comprises a plurality of retainers for holding a fiber-optic cable on said bend limiter and on said second cable routing path.

5. A fiber-optic cable routing and bend limiting device as recited by claim 4, wherein said separation bar further comprises a retainer for holding a fiber-optic cable on said second cable routing path.

6. A fiber-optic cable routing and bend limiting device as recited by claim 1, wherein said mounting plate further comprises:
   a mounting rail on opposite sides of said mounting plate;
   a locking tab for releasably securing said cable routing and bend limiting device to a structure.

7. A fiber-optic cable routing and bend limiting system for routing a fiber-optic cable and for limiting a bend radius of the fiber-optic cable as the cable is routed from a first enclosure to a second enclosure positioned adjacent to the first enclosure, said system comprising:
   a first fiber-optic cable routing and bend limiting device comprising:
      a base having a top surface defining a plane; and
      a bend limiter extending from an end of said base and in a direction generally perpendicular to and away from said plane, said bend limiter having an arcuate surface and a planar surface; and
   a second fiber-optic cable routing and bend limiting device comprising:
      a base having a top surface defining a plane; and
      a bend limiter extending from an end of said base and in a direction generally perpendicular to and away from said plane, said bend limiter having an arcuate surface and a planar surface;
   said planar surface of said first fiber-optic cable routing and bend limiting device and said planar surface of said second fiber-optic cable routing and bend limiting device each being sized and shaped to permit said first fiber-optic cable routing and bend limiting device and said second fiber-optic cable routing and bend limiting device to be positioned adjacent to each other, and wherein said arcuate surface of each of said first fiber-optic cable routing and bend limiting device and said second fiber-optic cable routing and bend limiting device define a continuous cable routing path.

8. A fiber-optic cable routing and bend limiting system as recite by claim 7, wherein each of said first and said second cable routing and bend limiting device further comprises:
   a mounting plate extending from an end of said base opposite of said bend limiter and in a direction generally perpendicular to and away from said plane; and
   a separation bar extending from said base and in a direction generally perpendicular to and away from said plane between said bend limiter and said mounting plate so as to define a first cable routing path between said separation bar and said bend limiter, and a second cable routing path between said separation bar and said mounting plate.

9. A fiber-optic cable routing and bend limiting system as recite by claim 8, wherein each said bend limiter further comprises a plurality of retainers for holding a fiber-optic cable on said bend limiter and on said first cable routing path.

10. A fiber-optic cable routing and bend limiting system as recite by claim 9, wherein each said separation bar further comprises a retainer for holding a fiber-optic cable on said first cable routing path.

11. A fiber-optic cable routing and bend limiting system as recite by claim 8, wherein each said mounting plate further comprises a plurality of retainers for holding a fiber-optic cable on said bend limiter and on said second cable routing path.

12. A fiber-optic cable routing and bend limiting system as recite by claim 11, wherein each said separation bar further comprises a retainer for holding a fiber-optic cable on said second cable routing path.

13. A fiber-optic cable routing and bend limiting system as recite by claim 8, wherein each said mounting plate further comprises:
   a mounting rail on opposite sides of said mounting plate;
   a locking tab for releasably securing said cable routing and bend limiting device to a structure.

* * * * *